(Model.)

P. W. GROOM.
Handle Socket for Shovels, Spades and Scoops.

No. 243,246. Patented June 21, 1881.

WITNESSES:
C. Neveux
C. Sedgwick

INVENTOR:
P. W. Groom
BY Munn & Co
ATTORNEYS.

UNITED STATES PATENT OFFICE.

PATRICK W. GROOM, OF ST. LOUIS, MISSOURI.

HANDLE-SOCKET FOR SHOVELS, SPADES, AND SCOOPS.

SPECIFICATION forming part of Letters Patent No. 243,246, dated June 21, 1881.

Application filed April 9, 1881. (Model.)

*To all whom it may concern:*

Be it known that I, PATRICK W. GROOM, of St. Louis and State of Missouri, have invented a new and useful Improvement in Handle-Sockets for Shovels, Spades, and Scoops, of which the following is a specification.

The object of my invention is to prevent rapid wearing off of the rivet-heads on the under side of shovels, spades, &c.

The invention consists in a handle-socket for shovels, scoops, &c., provided with a flange having recesses in its under surface around the rivet-holes, so that the lower heads of the rivets and that part of the sheet-iron of the shovel or scoop covered by these rivet-heads will be driven into these recesses, whereby the heads of the rivets will become flush with the under surface of the shovel, and consequently will not wear off as rapidly as they do in the shovels constructed heretofore.

Figure 1:
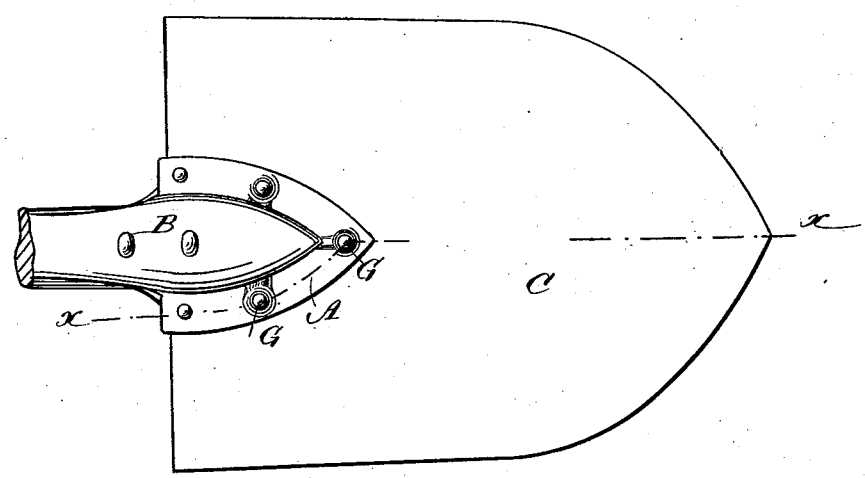
Figure 2:
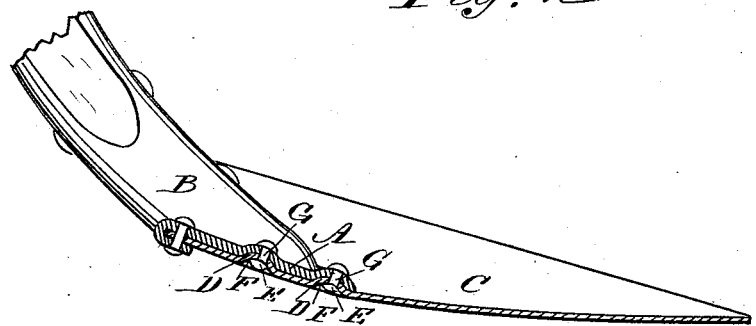

In the accompanying drawings, Figure 1 is a plan view of a shovel having a handle-socket with my improvement. Fig. 2 is a longitudinal sectional elevation of the same on the line $xx$, Fig. 1.

The flange A of the handle-socket B of a shovel, spade, or scoop, C, is provided with depressions or recesses D in the under side around the rivet-holes. The rivets G are passed through the apertures in the sheet metal of the shovel and through the rivet-holes in the flange A, and when the head is formed on the rivet the bottom head, E, forces part of the sheet metal of which the shovel is made into the recess around the rivet-hole in the under surface of the flange, thus forming a like recess, F, in the under side of the scoop or shovel, into which recess F the bottom rivet-head, E, passes. The outer end of the rivet-head E will thus be flush with the under surface of the shovel or scoop, and is thus protected, and will not wear off as rapidly as the rivet-heads on the under sides of shovels as made heretofore.

Having thus described my invention, I claim as new and desire to secure by Letters Patent—

1. A handle-socket for shovels, scoops, and spades, made, substantially as herein shown and described, with recesses or depressions in the under surface and around the rivet-holes, as set forth.

2. The combination, with the shovel-blade C, having the recesses F, of the handle-socket B, having recesses D in the under side around the rivet-holes, and the rivets G G, substantially as herein shown and described, and for the purpose set forth.

PATRICK W. GROOM.

Witnesses:
EDWARD CAREY,
FREDERICK STOCK.